United States Patent
Tahara et al.

[19]

[11] Patent Number: 5,945,931
[45] Date of Patent: Aug. 31, 1999

[54] METHOD AND APPARATUS FOR DECODING DIGITAL SIGNAL AND APPARATUS FOR REPRODUCING DIGITAL SIGNAL

[75] Inventors: Katsumi Tahara, Kanagawa; Mikita Yasuda, Tokyo; Motoki Kato, Kanagawa, all of Japan

[73] Assignee: Sony Corporation, Tokyo, Japan

[21] Appl. No.: 08/984,870

[22] Filed: Dec. 4, 1997

[30] Foreign Application Priority Data

Dec. 16, 1996 [JP] Japan .................................. 8-335668

[51] Int. Cl.$^6$ ............................. H03M 7/00; H04N 5/92
[52] U.S. Cl. ................................................. 341/50; 386/68
[58] Field of Search ................................ 341/50; 360/22, 360/23; 386/68, 69

[56] References Cited

U.S. PATENT DOCUMENTS

| | | | |
|---|---|---|---|
| 5,475,435 | 12/1995 | Yonemitsu et al. | 348/426 |
| 5,621,840 | 4/1997 | Kawamura et al. | 386/68 |
| 5,644,506 | 7/1997 | Okazaki et al. | 364/514 R |
| 5,652,823 | 7/1997 | Eto | 386/68 |
| 5,668,601 | 9/1997 | Okada et al. | 348/423 |
| 5,739,860 | 4/1998 | Hoshino et al. | 348/384 |
| 5,809,201 | 9/1998 | Nagasawa | 386/68 |

FOREIGN PATENT DOCUMENTS

| | | | |
|---|---|---|---|
| 0590974 A2 | 4/1994 | European Pat. Off. | G11B 27/031 |
| 0695094 A2 | 1/1996 | European Pat. Off. | H04N 7/26 |
| 0777228 A2 | 6/1997 | European Pat. Off. | G11B 27/00 |
| WO 94/03851 | 2/1994 | WIPO | G06F 3/00 |
| WO 96/31065 | 10/1996 | WIPO | H04N 7/173 |

OTHER PUBLICATIONS

U.S. application No. 08/634,122, filed Apr. 19, 1996.
U.S. application No. 08/958,569, filed Oct. 28, 1997.

*Primary Examiner*—Michael Tokar
*Assistant Examiner*—Anh Tran
*Attorney, Agent, or Firm*—Limbach & Limbach LLP

[57] ABSTRACT

A method and an apparatus for satisfactorily reproducing an image and voice even if skip reproduction is performed, the apparatus having a first decoding system for decoding coded data of each picture more forward than a skip start point, a second decoding system for decoding coded data of each picture following a skip end point and a switch which corresponds to skip reproduction so as to switch a data string decoded by the first decoding system to a data string decoded by the second decoding system. The second decoding system completes decoding of all of pictures required to decode pictures following the skip end point prior to completion of decoding pictures more forward than the skip start point by the first decoding system. When the first decoding system has decoded the pictures more forward than the skip start point, the second decoding system outputs decoded data of each picture following the skip end point. The switch switches an output from the first decoding system to an output from the second decoding system when the first decoding system has decoded pictures more forward than the skip start point.

15 Claims, 10 Drawing Sheets

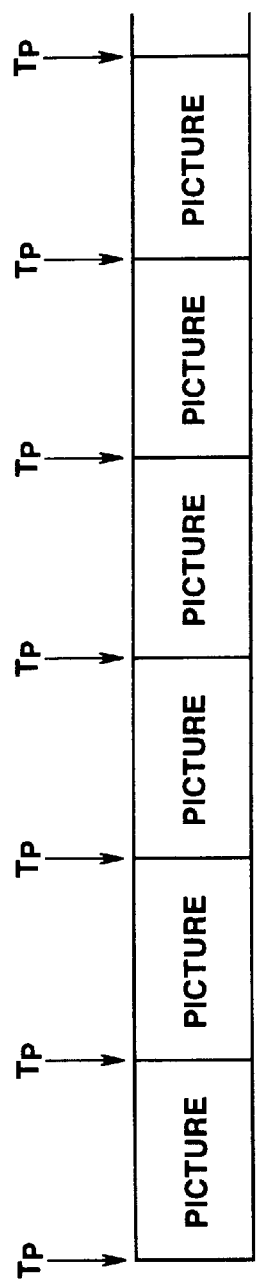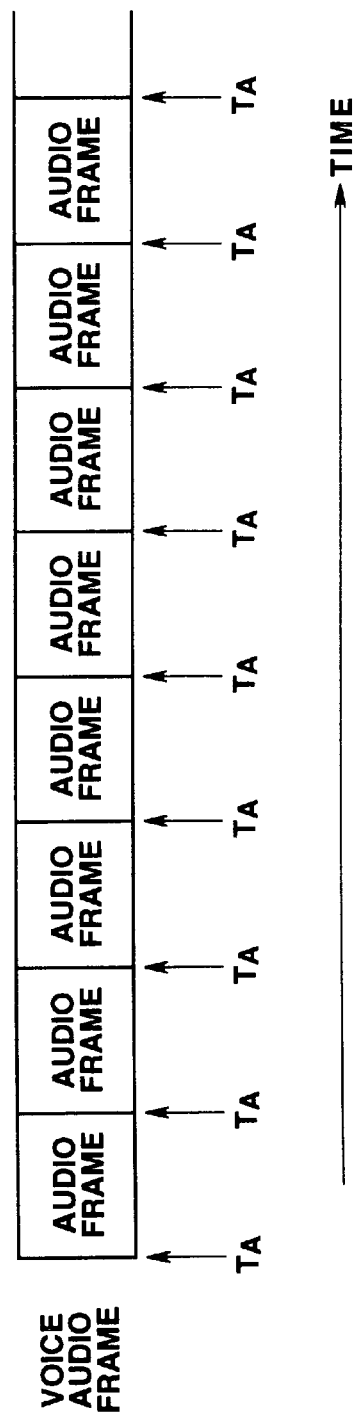
FIG.3A IMAGE PICTURE
FIG.3B VOICE AUDIO FRAME

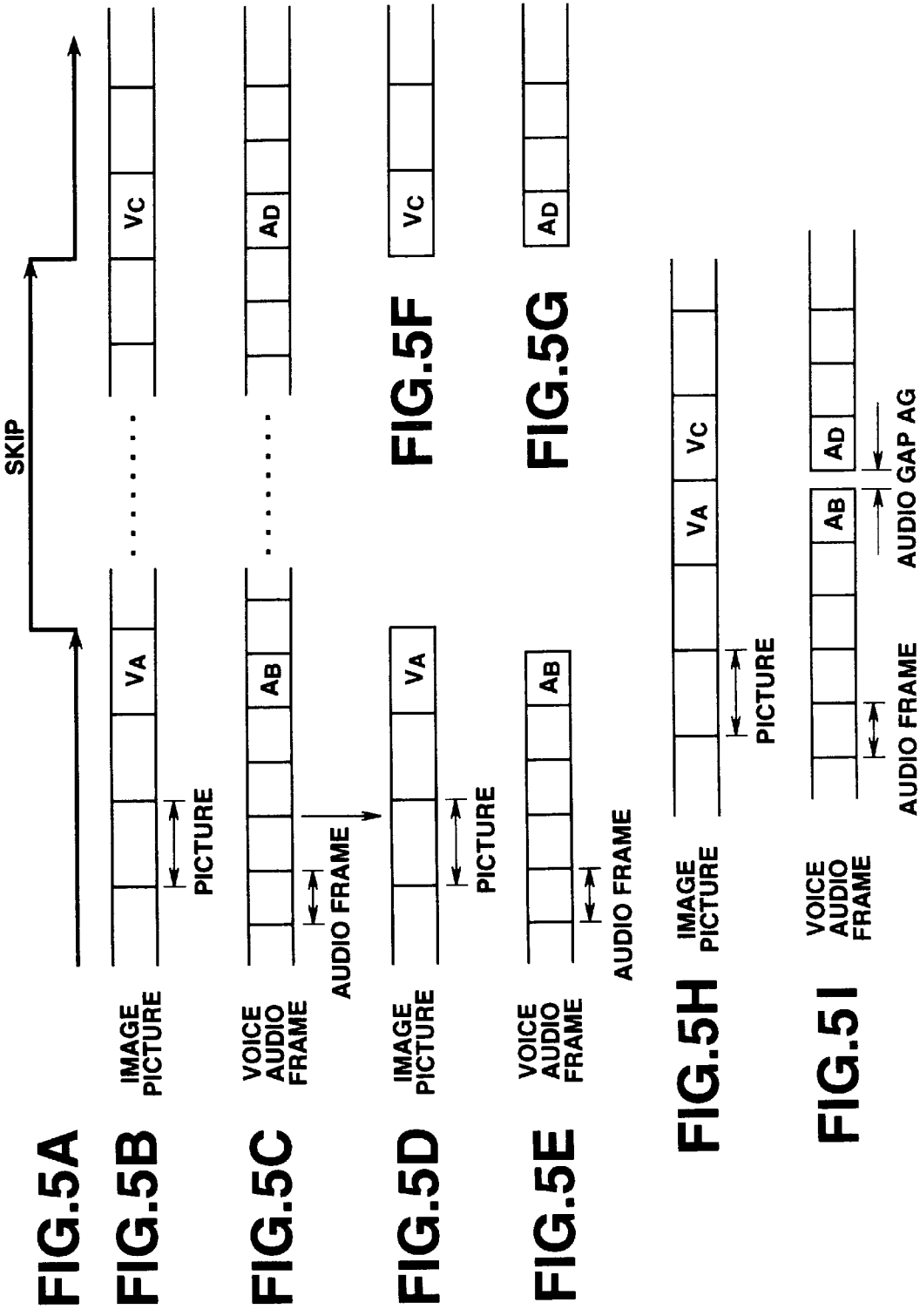

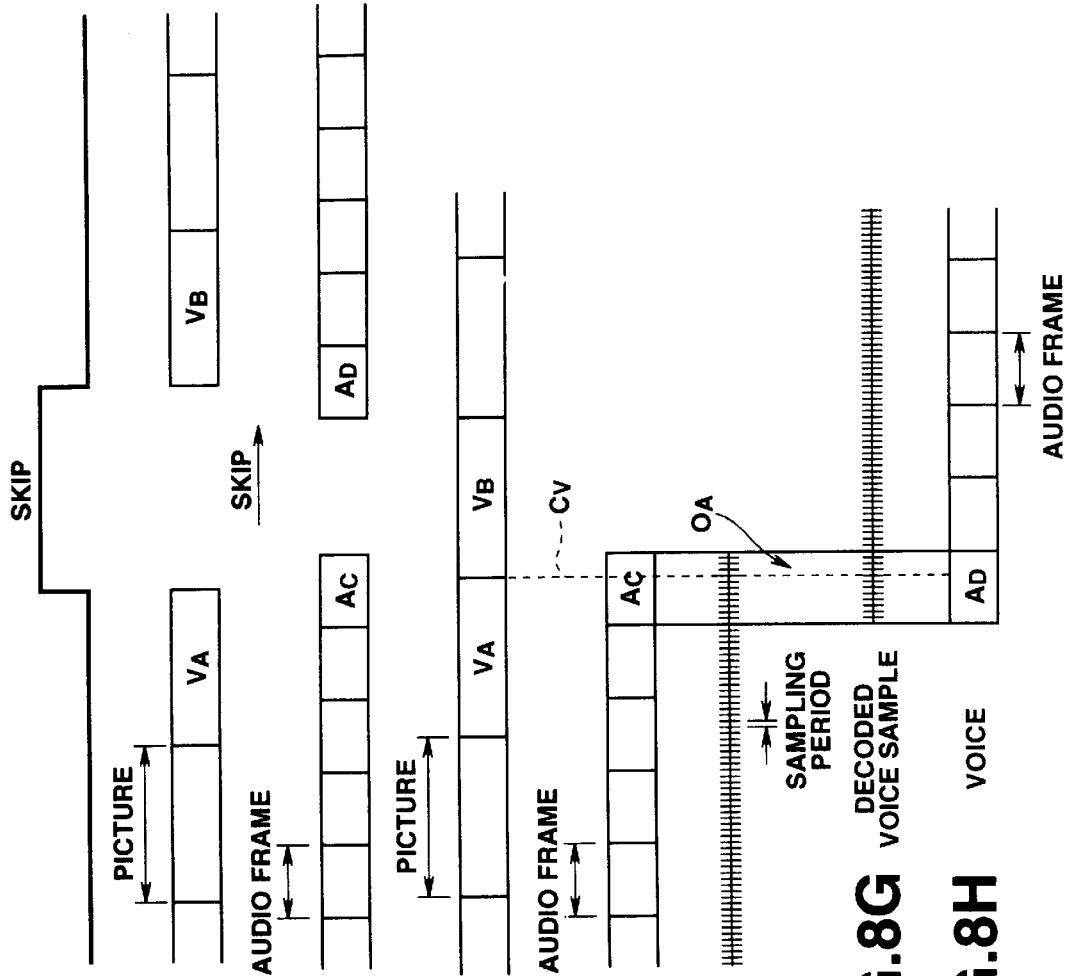

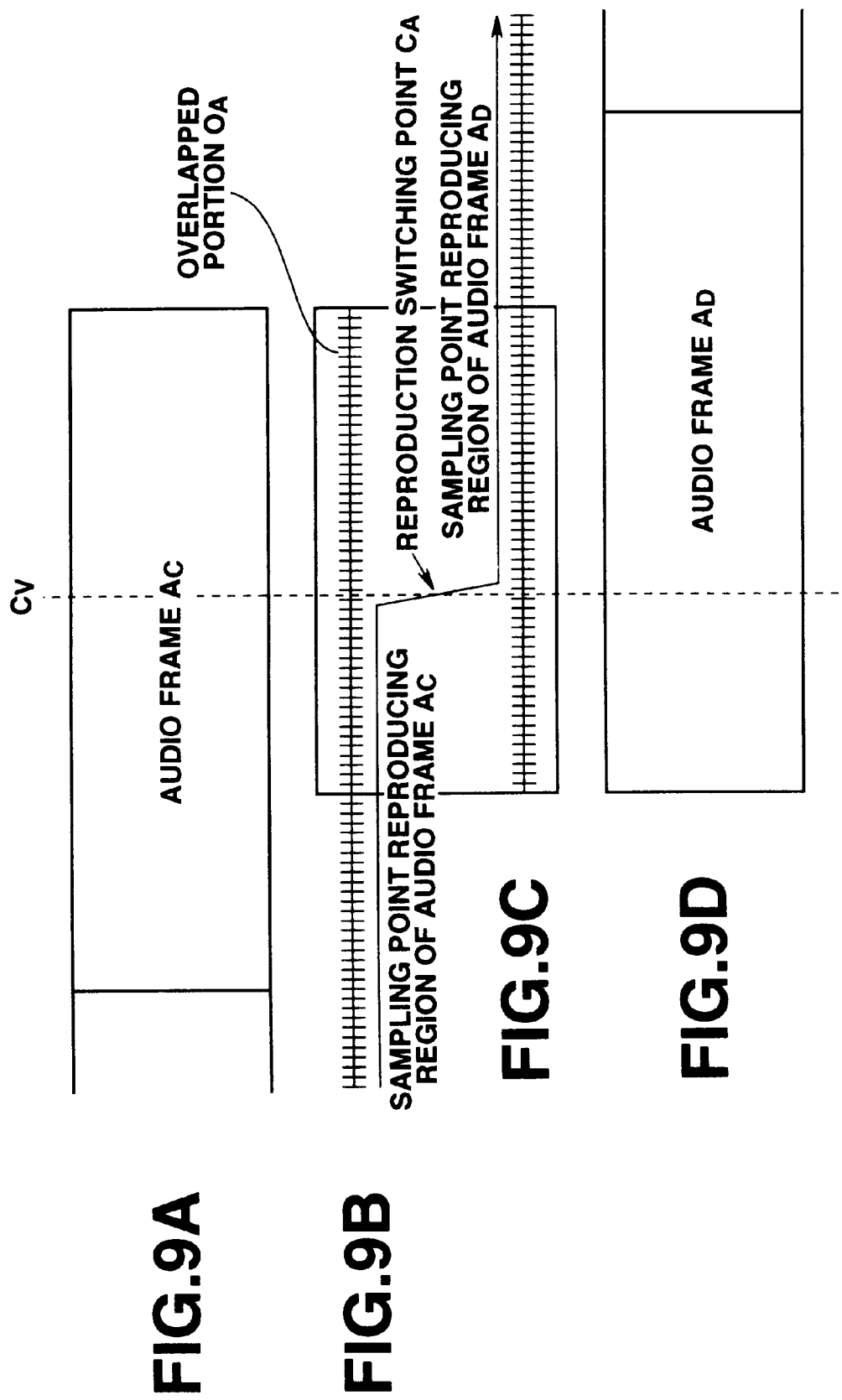

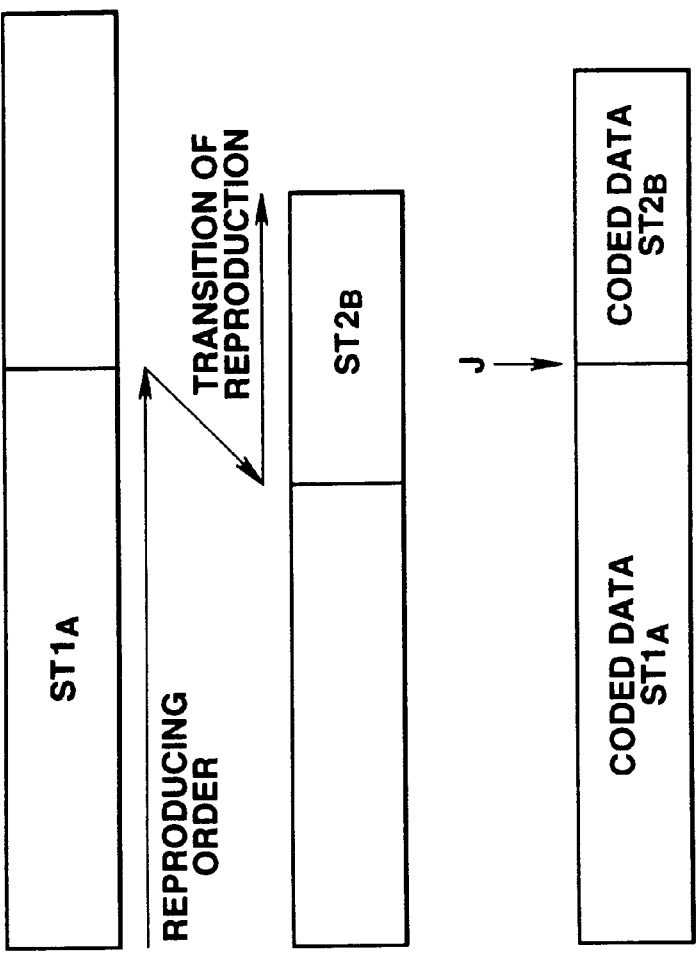
FIG.10A CODED DATA ST1
FIG.10B CODED DATA ST2
FIG.10C CODED DATA TO BE REPRODUCED

METHOD AND APPARATUS FOR DECODING DIGITAL SIGNAL AND APPARATUS FOR REPRODUCING DIGITAL SIGNAL

BACKGROUND OF THE INVENTION

1. Field of the Invention

The present invention relates to a method and an apparatus for decoding a digital signal and an apparatus for reproducing a digital signal with which video signals and audio signals can satisfactorily be recorded on a random-access recording medium, such as a magneto optical disc, and the recorded signals can satisfactorily be reproduced from the recording medium and displayed on a display unit or the like.

2. Description of Prior Art

FIG. 1 shows the structure of a conventional system for decoding coded data, which has been recorded on a random-access storage medium and for displaying decoded data.

Referring to FIG. 1, a storage medium 101 is an optical disc or the like which permits a random access. Coded data, which has been recorded on the storage medium 101, is read by a reading unit 102 and temporarily stored in a track buffer 103, if necessary. Data read from the storage medium 101 and stored in the track buffer 103 is usually in the form in which coded video and audio data is, as one data string, time-division-multiplexed.

Coded video and audio data, which have been time-division-multiplexed, are read from the track buffer 103 as described above, and then separated into coded video data and coded audio data by a separator 104. Thus-separated coded video data and audio data are supplied to corresponding decoding buffers 105V and 105A. Coded data items, stored in the decoding buffers 105V and 105A, are read at a predetermined timing, and then transmitted to corresponding image decoder 106V and audio decoder 106A so as to be decoded. A video signal, obtained by the decoding operation performed by the image decoder 106V, is supplied to an image display unit 107V so as to be displayed. On the other hand, an audio signal obtained by the decoding operation performed by the audio decoder 106A is, as sound, reproduced from a sound generator 107A, for example, a loud speaker unit.

As described above, a system of the foregoing type arranged in such a manner that video and audio signals are recorded on a recording medium, such as an optical disc or a magnetic tape, and the recorded signals are reproduced to be displayed on a display unit, or a system, such as a video conference system or a picture phone system, in which video and audio signals are transmitted from a transmission side through a predetermined passage to be displayed on the receiving side, has recently and usually been arranged in such a manner that the video and audio signals are A/D (analog/digital)-converted and then coded by a so-called MPEG (Moving Picture Experts Group) method so that the quantity of information is reduced by compression.

The MPEG is an abbreviation of an investigating organization for coding dynamic images for storage, which is included in ISO/IEC JTC1/SC29 (International Organization for Standardization/International Electrotechnical Commission, Joint Technical Committee 1/Sub Committee 29). MPEG1 includes ISO 11172, while MPEG2 includes ISO 13818. In the above-mentioned international standards, ISO 11171-1 and ISO 13818-1 have been standardized in the category of system multiplication, ISO 11172-2 and ISO 13818-2 have been standardized in the category of image coding, and ISO 11172-3 and ISO 13818-2 have been standardized in the category of audio coding.

The MPEG has three coding types including I picture, B picture and P picture in order to efficiently code an image and realize a random access. The "picture" is formed by coding a picture (a frame or a field) forming a dynamic image.

The I picture has a form in which coding has been completed in the picture, the I picture being coded individually from other pictures. Therefore, the I picture is used in an random access operation and to serve as an entry point for recovering an error. If the frequency of the I pictures is raised, the efficiency in coding information deteriorates.

The P picture is a mode in which predictive coding in a forward direction is performed, the P picture being predicted from a previous I picture or P picture. Therefore, the P picture can be decoded only when the previous I picture or the P picture have been decoded. By using the P picture, the coding efficiency can be improved as compared with a process in which coding is performed by using only the I picture.

The B picture, which is development of the P picture, is a mode in which predictive coding in the two directions is performed. Previous and future I pictures or P pictures are used to perform prediction in the forward direction, or the backward direction or two directions. Therefore, the B picture can be decoded only when the forward and backward I pictures or P pictures have been decoded. By using the B picture, the coding efficiency can significantly be improved.

In general, random access is enabled and a satisfactory coding efficiency can be realized by combining I, B and P pictures.

FIG. 2A shows an example of the combination. FIG. 2A shows the above-mentioned pictures arranged in the displaying order. An arrow d shown in FIG. 2A indicates a direction in which prediction is performed. When B picture is attempted to be decoded and displayed, the I pictures or the P pictures to be displayed at positions more forwards than or following (in terms of time) the B picture must be decoded (decoding must be performed prior to decoding the B picture). Specifically, when the image of, for example, picture B5 is decoded to realize the displaying order shown in FIG. 2A, at least pictures I0, P2, P4 and P6 must be decoded previously. That is, the picture P2 is predicted from the picture I0, the picture P4 is predicted from the picture P2, the picture P6 is predicted from the picture P4 and the picture B5 is predicted from the pictures P4 and P6. Therefore, the pictures I0, P2, P4 and P6 must previously be decoded to decode the picture B5. Accordingly, the pictures have been rearranged in an order as I0, P2, B1, P4, B3, . . . , on the coding stream, as shown in FIG. 2B. That is, the coding stream having the order of pictures as shown in FIG. 2B has been recorded on the recording medium. Therefore, when the recording medium is reproduced and an image is displayed on the display unit, display is performed in such a manner that the pictures are decoded from the coding stream reproduced from the recording medium in the order shown in FIG. 2B after which rearrangement to the order shown in FIG. 2A is performed.

Audio data is coded by compression methods including so-called AC-3 (ATSC standard Doc. A/52, 20 Dec. 1995) as well as the MPEG. The foregoing compression methods are arranged in such a manner that a predetermined number of sampled data items are collectively treated to serve as a coded unit. The decoding process is performed by using the collected data items as the coding units.

In general, the decoding periods of audio frames which are coded units for voice and decoding periods of pictures obtained by coding video data do not coincide with each other. FIG. 3 shows the foregoing decoding periods expressed in the order of time. FIG. 3A shows component units (pictures) of coded data of an image and display start time $T_P$ of each picture. FIG. 3B shows component units (audio frames) of coded data for voice and start time $T_A$ of each audio frame. That is, a fact can be understood from FIGS. 3A and 3B that the decoding periods of the audio frames and those of pictures do not coincide with one another.

Video CD and DVD (Digital Video Disc), standardized and introduced to the market in recent years, are arranged to be adapted to the MPEG method having the above-mentioned structure so that an image is coded, voice is coded by MPEG or AC-3 and then data above is time-division-multiplexed by the standard of the MPEG system so as to be recorded on the disc.

A case will be considered in which video data coded by the MPEG method has been recorded on the storage medium 101 shown in FIG. 1. In consideration of the coding efficiency and random access, an assumption is made that data above has been recorded with the structure of the pictures shown in FIG. 4A.

If the storage medium 101 permits the random access, a stream shown in FIG. 4A can be reproduced in such a manner that, for example, pictures in a region reaching P picture at point $S_A$ shown in FIG. 4A are reproduced, after which reproduction of following pictures is skipped, and then reproduction is restarted at B picture (picture B3) at point $S_B$ shown in FIG. 4A. The omission of reproduction of pictures will hereinafter be called "skipping", while reproduction which is carried out after skipping to a distant picture from a certain picture has been performed will hereinafter be called "skip reproduction". A position at which skipping is commenced is called a "skip start point", while a position at which skipping is completed is called a "skip end point".

As described above, the B picture (picture B3 in the case shown in FIG. 4) can be decoded only when the previous I picture or the P picture (at least pictures I0, P2 and P4 in the case shown in FIG. 4) have been decoded. Therefore, continuous reproduction of images is undesirably interrupted during the process for decoding the foregoing pictures (I0, P2 and P4).

In addition to the case where video signals have been coded by the MPEG method, a case where a predictive coding method is employed in which correlation between images is used to obtain the difference between the images so as to code the difference suffers from discontinuous reproduction at the seam between pictures when the skip reproduction is performed.

As described above, the voice coding methods, such as the MPEG and AC-3, in which a predetermined number of sampled data items are collected to be used as coded units encounters the fact that the decoding periods of the video signals and the decoding periods of audio signals do not necessarily coincide with one another. Therefore, if the continuous reproduction of video signals is given priority when the skip reproduction is performed, blank regions are undesirably generated in which any audio signal is not reproduced as described below. The blank region, in which any audio signal is not reproduced when the skip reproduction is performed, is called an "audio gap".

FIGS. 5B and 5C show coded data of an image and voice recorded on a storage medium in the order in terms of time.

A case will now be considered in which a video signal shown in FIG. 5B is decoded until pictures to a certain picture (the skip start point which is picture $V_A$ in the case shown in FIG. 5D) are decoded and displayed as shown in FIG. 5D, after which reproduction and decoding are restarted at another picture (skip end point which is picture $V_C$ in the case shown in FIG. 5F) shown in FIG. 5F by skip reproduction which is performed at a timing shown in FIG. 5A.

When an audio signal corresponding to skip reproduction of a video signal is decoded, decoding of audio frames to audio frame $A_B$ corresponding to the picture $V_A$ is performed as shown in FIG. 5E. Then, reproduction and decoding are restarted at audio frame $A_D$, which corresponds to the picture $V_C$ as shown in FIG. 5G, to correspond to the skip reproduction.

Since an image and voice must be reproduced in synchronization with each other, the phase difference of the audio signal with respect to the video signal, that is, the phase difference between display start time for the picture and start time for the audio frame must be maintained when reproduction is performed regardless of a fact whether or not the skip reproduction is performed.

When the skip reproduction is performed in such a manner that the image is given priority, that is, the picture $V_A$ and the picture $V_C$ more forward than the skip reproduction point and following the same are continuously displayed as shown in FIG. 5H, audio data encounters a time width (audio gap AG) in which no audio data exists as shown in FIG. 5I. As a result, continuous audio reproduction cannot be performed.

Although the description has been made about discontinuity of decoded data in the skip reproduction, a similar problem arises because of the same principle when two decoded data items, which have been individually coded, are reproduced by connecting at an arbitrary point.

OBJECT AND SUMMARY OF THE INVENTION

Accordingly, an object of the present invention is to provide a method and an apparatus for decoding a digital signal and an apparatus for reproducing a digital signal each of which is capable of satisfactorily reproducing an image and voice even if skip reproduction is performed.

To achieve the above-mentioned object, according to one aspect of the present invention, there is provided a method of decoding a digital signal in such a manner that a coded data string read from a random access storage medium on which at least one coded data string in which predetermined coded units are continued is recorded is decoded, the method of decoding a digital signal including the steps of: a first decoding step for, in the coded units, decoding a first coded data string more forward than a skip start point in a random access; a second decoding step for decoding, in the coded units, a second coded data string including all of coded units required to perform decoding at a skip end point in the random access; and a switching step for switching a first decoded data string obtained by a decoding operation performed in the first decoding step to a second decoded data string obtained by a decoding operation performed in the second decoding step to correspond to skipping in the random access, wherein the second decoding step is arranged in such a manner that decoding of all of coded units required to perform decoding at the skip end point is completed prior to completion of decoding of the coded units to the skip start point in the first decoding step, and decoding of the coded units following the skip end point is commenced when decoding of the coded units to the skip start point in the first decoding step has been completed, and the switching step is arranged in such a manner that the first decoded data string is switched to the second decoded data string following the skip end point when decoding of the coded units to the skip start point in the first decoding step has been completed.

According to another aspect of the present invention, there is provided an apparatus for decoding a digital signal to read a coded data string from a random access storage medium on which at least one coded data string in which predetermined coded units are continued is recorded to decode the coded data string, the apparatus for decoding a digital signal including: first decoding means for, in the coded units, decoding a first coded data string more forward than a skip start point in a random access; second decoding means for decoding, in the coded units, a second coded data string including all of coded units required to perform decoding at a skip end point in the random access; and switching means for switching a first decoded data string obtained by a decoding operation performed by the first decoding means to a second decoded data string obtained by a decoding operation performed by the second decoding means to correspond to skipping in the random access, wherein the second decoding means completes decoding of all of coded units required to perform decoding at the skip end point prior to completion of decoding of the coded units to the skip start point by the first decoding means, and commences decoding of the coded units following the skip end point when decoding of the coded units to the skip start point has been completed by the first decoding means, and the switching means switches the first decoded data string to the second decoded data string following the skip end point when the first decoding means has decoded the coded units to the skip start point.

According to another aspect of the present invention, there is provided an apparatus for reproducing a digital signal to read a coded data string from a random access storage medium on which at least one coded data string in which predetermined coded units are continued is recorded to decode the coded data string, the apparatus for reproducing a digital signal including: reading means for reading the coded data string from the storage medium; storage means on which the coded data string read from the storage medium by the reading means is stored; first and second decoding means for independently decoding the coded data string read from the storage means; and switch means for selectively outputting the first decoded data string obtained by a decoding operation performed by the first decoding means or the second decoded data string obtained by a decoding operation performed by the second decoding means, wherein when the coded data string is read from the storage medium by performing a random access, the reading means reads a first coded data string more forward than a skip start point in the random access and a second coded data string including all of coded units required to perform decoding at a skip end point in the random access, at least the first coded data string more forward than the skip start point and the second coded data string including all of the coded units required to perform decoding at the skip end point, each of which has been read from the storage medium by the reading means, are stored in the storage means, the first decoding means, in the coded units, decodes the first coded data string more forward than the skip start point which has been read from the storage medium, the second decoding means completes decoding of all of the coded units required to perform decoding at the skip end point and read from the storage medium prior to completion of decoding of the coded units more forward than the skip start point by the first decoding means, and commences decoding of the coded units following the skip end point when the first decoding means has decoded the coded units more forward than the skip start point, and the switching means switches the first decoded data string to the second decoded data string following the skip end point when the first decoding means has decoded the coded units more forward than the skip start point.

The present invention has the structure that two or more decoding steps are independently performed to previously decode data more forward than the skip reproduction and that following the same in the random access. Then, the outputs from the decoding steps are switched at a predetermined timing so that decoded data more forward than the skip start point and following the skip end point are continuously be reproduced.

Other objects, features and advantages of the invention will be evident from the following detailed description of the preferred embodiments described in conjunction with the attached drawings.

BRIEF DESCRIPTION OF THE DRAWINGS

FIGS. 3A and 3B shows the difference between the decoding period for an image and that for voice;

FIGS. 5A through 5I and diagrams showing a voice blank period generated attributable to the difference between the decoding period for an image and that for voice;

FIGS. 8A through 8H are diagrams showing a process for decoding audio data which is performed by the digital-signal reproducing apparatus according to the embodiment of the present invention;

FIGS. 9A through 9D are diagrams showing a switching timing of audio data in the digital-signal reproducing apparatus according to the embodiment of the present invention; and FIGS. 10A through 10C are diagrams showing the connection between two coded data items which have independently been coded.

DETAILED DESCRIPTION OF THE INVENTION

An embodiment of the present invention will now be described with reference to the drawings.

Figure 6:
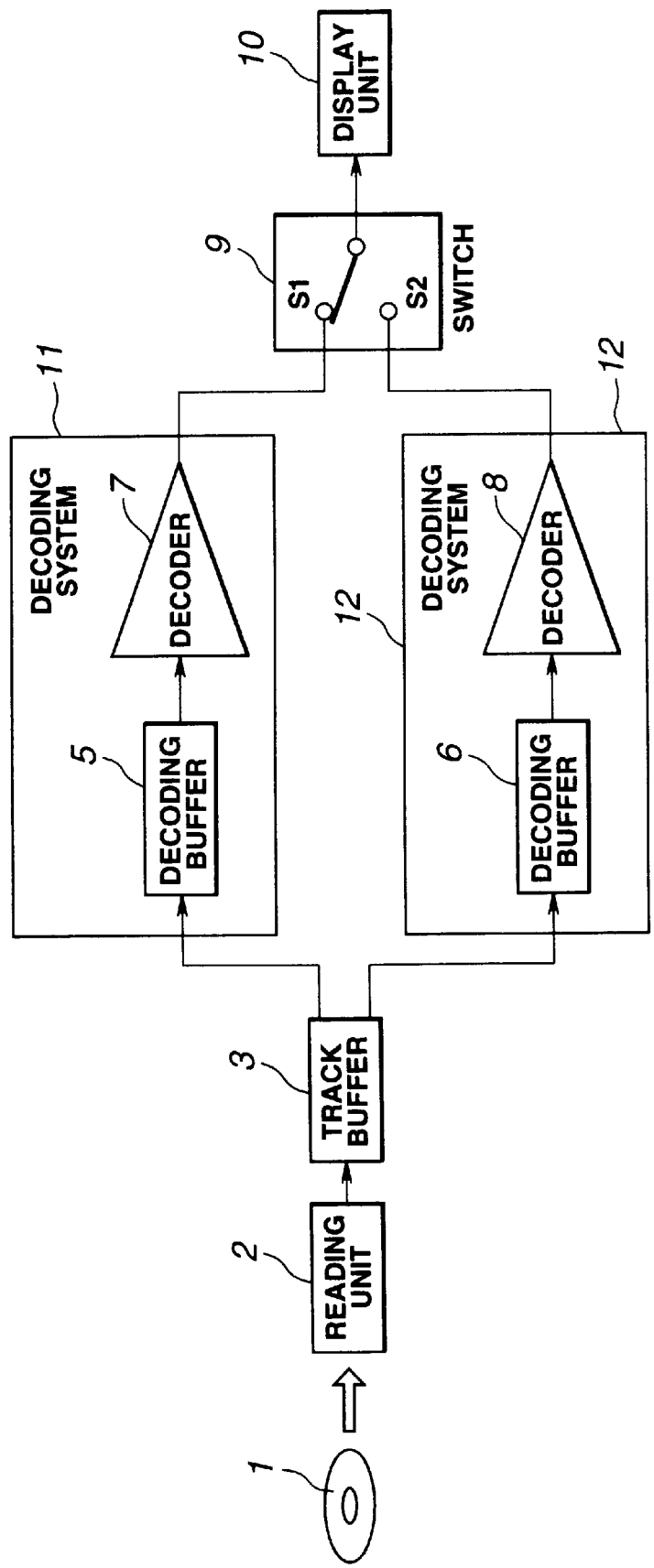
FIG. 6 is a circuit diagram showing the basic structure of a digital-signal reproducing apparatus according to an embodiment of the present invention.

FIG. 6 shows the basic structure of a digital-signal reproducing apparatus according to an embodiment of a digital-signal decoding apparatus according to the present invention and arranged to read and decode coded data which has been recorded on a storage medium. The digital-signal reproducing apparatus according to this embodiment has two independent decoding systems 11 and 12. To simplify the illustration, FIG. 6 shows a state where data obtained by coding only video signal by the MPEG method has been recorded on a storage medium 1.

The digital-signal reproducing apparatus shown in FIG. 6 performs reproduction in such a manner that a portion of one continuous coded data item is skipped (skip-reproduced) on a random access storage medium 1 on which coded digital signals (coded video signals) have been recorded. To perform the reproduction, the digital-signal reproducing apparatus has a first decoding system 11 for reproducing first coded data positioned in front of an omitting point (in front of a skip start point) to a skip start point and a second decoding system 12 for previously decoding data following an omission end point (the skip end point), that is, data from the leading end of a coded unit of second coded data to a connection point. Then, the second decoding system 12 is brought to a standby mode. Immediately after reproduction has been performed by the first decoding system 11 at the connection point for the skip reproduction, the second decoding system 12 in the standby mode starts reproducing coded data. To prevent the two decoded signals from becoming discontinuous in terms of time, output signals from the decoding systems 11 and 12 are switched by a switch 9 at a predetermined timing when the reproduction is performed.

Referring to FIG. 6, a unit 2 for reading coded data reads a coded video signal (hereinafter called "coded data") recorded on the storage medium 1 to store coded data in a track buffer 3. The reading unit 2 is able to make a random access to the storage medium 1. When the skip reproduction is performed, the reading unit 2 is able to sequentially read coded data more forward than the skipped region and following the same to store coded data in the track buffer 3. If data has been coded by the MPEG method as is performed in this embodiment (that is, if the difference between images has been coded), the reading unit 2 reads all of coded data items of the picture required to decode the picture at the omission end point (the skip end point). In the above-mentioned case shown in FIG. 4, the reading unit 2 reads coded data items of picture I0, P2 and P4 which are minimal data items required to decode the picture B (picture B3) to store the same in the track buffer 3.

Coded data read from the track buffer 3 is supplied to the first and second decoding systems 11 and 12.

The first decoding system 11 basically includes a decoding buffer 5 and a decoder 7. Also the second decoding system 12 includes a decoding buffer 6 and a decoder 8. Each of the decoding buffers 5 and 6 has a function for storing coded data read from the track buffer 3 during a period in which decoders 7 and 8, disposed in the rear of the decoding buffers 5 and 6, decode coded data. Note that reading of data from the track buffer 3 to the decoding buffer 5 of the first decoding system 11 and that to the decoding buffer 6 of the decoding system 12 are performed simultaneously, if necessary. Each of the decoders 7 and 8 independently decodes coded data supplied from the corresponding decoding buffers 5 and 6.

Coded data output from the first decoding system 11 is supplied to a switch terminal S1 of a switch 9, while coded data output from the second decoding system 12 is supplied to a switch terminal S2 of the switch 9.

The switch 9 selectively switches coded data supplied from each of the decoding systems 11 and 12 at a predetermined timing, to be described later, so as to output coded data to a display unit 10. Therefore, display on the display unit 10 is performed in such a manner that display which is performed in accordance with coded data supplied from the first decoding system 11 and display which is performed in accordance with coded data supplied from the second decoding system 12 are selectively switched.

When the digital-signal reproducing apparatus according to this embodiment performs an operation in such a manner that coded data which is continued in terms of time is reproduced from the storage medium 1, after which coded data is decoded and then decoded data is as it is displayed in a usual manner, coded data decoded by only either of the first decoding system 11 or the second decoding system 12 is supplied to the display unit 10.

When coded data, which is not continued in terms of time, is decoded by the skip reproduction, the following operation is performed.

An assumption is made that decoding of coded data more forward than the skip point (the skip start point) has been performed by the first decoding system 11. At this time, the switch terminal S1 of the switch 9 has been selected. Therefore, the display unit 10 performs display corresponding to coded data decoded by the first decoding system 11 and placed more forward than the skip start point, that is, the display unit 10 displays an image obtained by decoding coded data read from the storage medium 1 before skipping is performed. As described above, at the time before the skip start point, coded data more forward than the skip start point and read from the storage medium 1 by the reading unit 2 is read to be stored in the decoding buffer 5 of the first decoding system 11 through the track buffer 3. Then, read coded data is decoded by the decoder 7 so as to be supplied to the display unit 10 through the switch 9 and then displayed on the display unit 10.

When skip reproduction is performed, the reading unit 2 reads, from the storage medium 1, coded data before skipping is performed. Then, reading unit 2 makes a random access to the storage medium 1 to read coded data immediately after (the skip end point) from the storage medium 1 so as to sequentially output coded data more forward than the skip start point and coded data adjacent to the skip end point to the track buffer 3.

Coded data read from the storage medium 1 as data following the skip end point includes all data items required to decode an image which is displayed at the skip end point. In the case shown in FIG. 4 in which the picture at the skip end point is the picture B3, the reading unit 2 reads, from the storage medium 1, coded data corresponding to the pictures I0, P2 and P4 required to decode the picture B3. Specifically, the reading unit 2 reads, from the storage medium 1, a recording region (the region on which coded data of the picture B3 has been recorded in the case shown in FIG. 4) corresponding to the address of the skip end point in such a manner that the reading unit 2 also, by the random access, reproduces a recording region on which coded data of the pictures I0, P2 and P4 required to decode the picture B3 has been recorded.

As a result, at least coded data at the skip start point and that adjacent to the skip end point are stored in the track buffer 3. That is, in the case shown in FIG. 4, at least coded data of the P picture at the skip start point indicated with point $S_A$ shown in FIG. 4, coded data of B picture (picture B3) at the skip end point indicated with point $S_B$ shown in FIG. 4 and coded data of pictures I0, P2 and P4 required to decode the picture B3 simultaneously exist on the track buffer 3.

Note that coded data at the skip start point and that adjacent to the skip end point must be stored in the track buffer 3 as described above. Moreover, coded data must be stored in the track buffer 3 in a quantity with which display on the display unit 10 cannot be interrupted during the random access made by the reading unit 2 to the storage medium 1 for the skip reproduction. That is, the pictures more forward than the skip start point and those following the skip end point are connected to each other to be continued in terms of time so as to be displayed. Interruption of display of images must be prevented during the recording medium made by the reading unit 2 to the storage medium 1 for performing the skip reproduction. Thus, coded data for a plurality of pictures are stored in the track buffer 3. That is, coded data of pictures in a quantity with which at least display can be performed for the time required to complete the recording medium must be stored in the track buffer 3 before skipping is performed. When skipping is performed, stored coded data of the pictures are sequentially read to be supplied to the following structure. During this, data of the picture at the skip end point is read by the random access operation performed by the reading unit 2. If the reading speed for the reading unit 2 to read the storage medium 1 is raised to a level higher than the speed required to display images by a usual real time method to enable the same coded data to be repeatedly read from the storage medium 1, the track buffer 3 is not required to have a storage capacity larger than that corresponding to the time required to perform the random access. Even if coded data corresponding to the time required to perform the random access does not exist in the track buffer 3 when skipping is performed, display of images is not interrupted because the reading unit 2 quickly reads required coded data from the storage medium 1.

Figure 1:
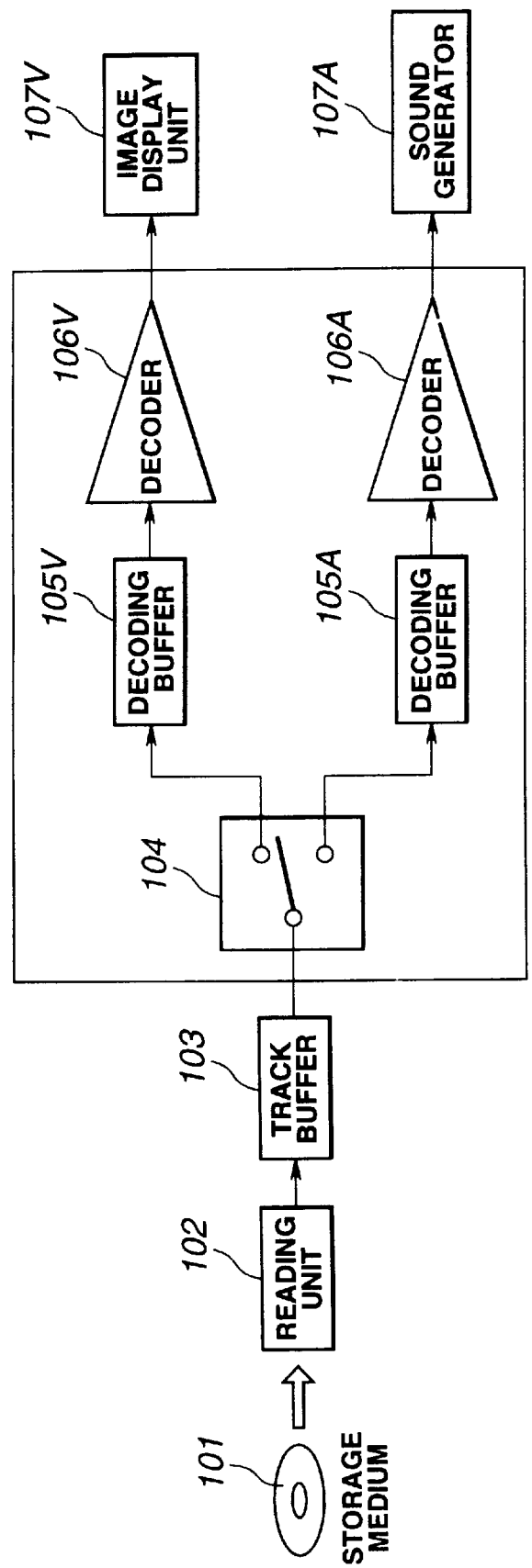
FIG. 1 is a circuit diagram showing an example of a conventional structure for decoding coded data which has been recorded on a storage medium.
Figures 2A, 2B:
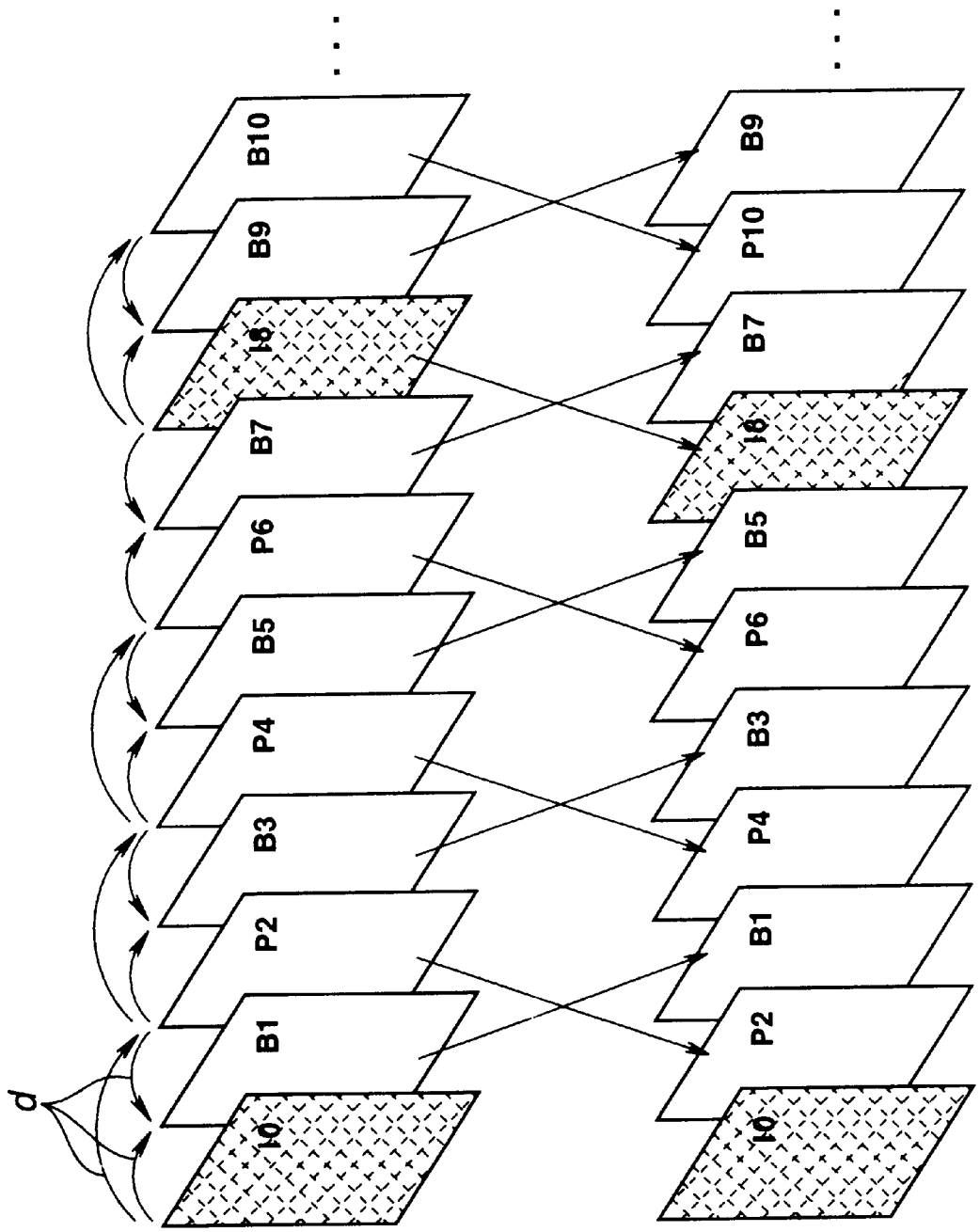
FIGS. 2A and 2B are diagrams showing a coding type realized by an MPEG method and a direction in which prediction is performed.
Figures 4A, 4B:
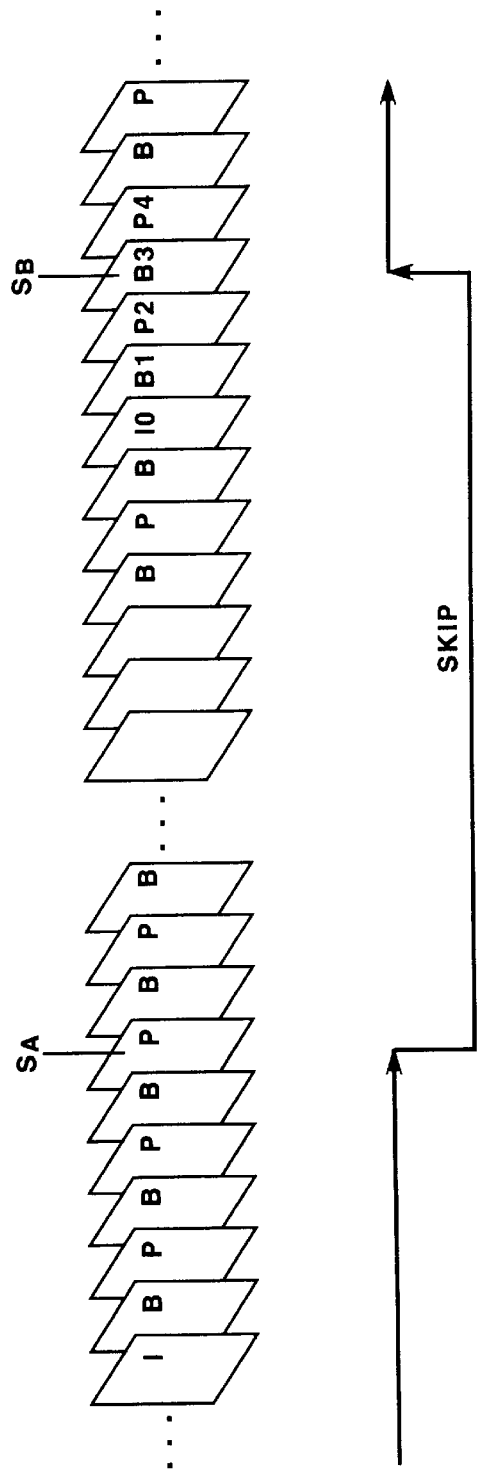
FIGS. 4A and 4B show a state in which video data coded by the MPEG method and recorded on the storage medium is skip-reproduced.

Also in a case where skip reproduction is not performed by instructing the address, that is, in a case shown in FIG. 4 in which B picture (picture B3) has been read by skip reproduction, the I picture (the picture I0) and the P picture (pictures P2 and P4) required to decode the picture B3 must be read from the storage medium 1. Since the position on the storage medium 1 to which the reading position of the reading unit 2 is moved by the random access can substantially be predicted in accordance with the random access speed or the like, also the position, at which coded data of I picture and the like have been recorded can be predicted. Thus, reading of coded data of I picture and the like can be performed in accordance with a result of the prediction.

When the skip reproduction has been performed, the second decoding system 12 is supplied with data adjacent to the skip end point, that is, supplied with all data items read from the track buffer 3 and required to decode the image to be displayed immediately after skipping has been performed, supplied data being then supplied to the decoding buffer 6. Data read from the decoding buffer 6 is supplied to the decoder 8 so as to be decoded. Then, data above is stored in the memory in the decoder 8, if necessary. That is, in the case shown in FIG. 4, pictures I0, P2 and P4 are sequentially previously decoded and stored to display the picture B3.

Decoded data read from the decoder 8 is, by the switch 9, switched to decoded data supplied from the first decoding system 11 at a predetermined timing. That is, the decoder 8 stores coded data above in the memory therein, and waits for selection of the switch terminal S2 of the switch 9. When the switch 9 has been switched to the switch terminal S2, the decoder 8 outputs coded data stored in the foregoing memory. The switch 9 switches the switch terminal S1 to the switch terminal S2 at a timing at which display of all images before the skipping operation is performed has been completed.

As a result, skip reproduction display of images in the form obtained by, in terms of time, connecting the image at the skip start point and the image at the skip end point to each other is performed on the display unit 10.

After the skip reproduction has been performed and thus decoding, which is performed by the second decoding system 12, has been commenced, the decoding operation, which is performed by the second decoding system 12, is continued as a process for performing display. When a next skipping operation is performed, an operation similar to the switch of the first decoding system 11 to the second decoding system 12 is performed so that the second decoding system 12 is switched to the first decoding system 11.

Figure 7:
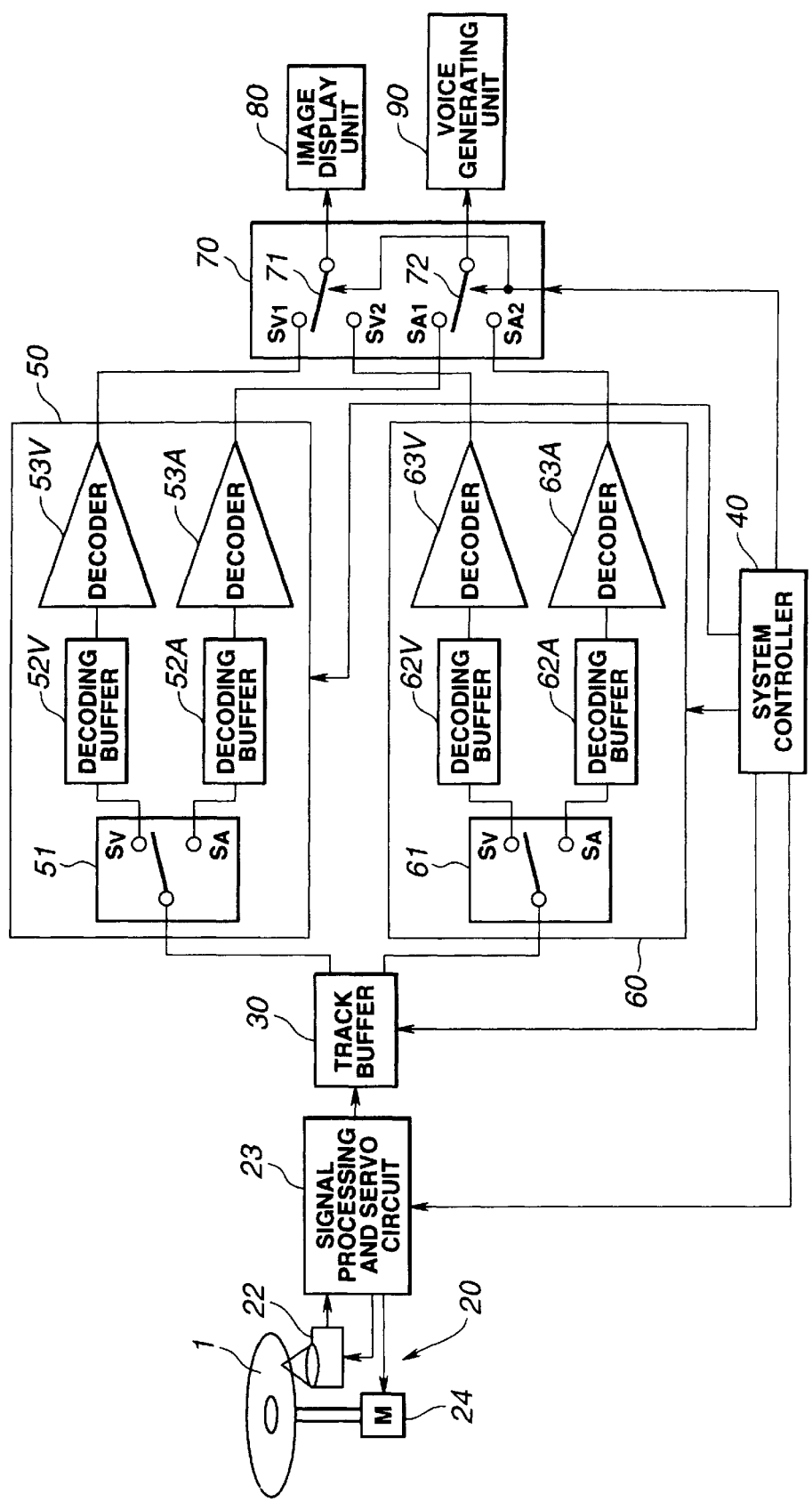
FIG. 7 is a circuit diagram showing a specific structure of a digital-signal reproducing apparatus according to the embodiment of the present invention and arranged to treat images and voice.

Although the structure and method shown in FIG. 6 have been described about a case where video data is reproduced from the storage medium 1, a structure shown in FIG. 7 is employed in a case where video data and audio data are recorded in a time-division-multiplexing manner. Also the structure shown in FIG. 7 includes two independent decoding systems 50 and 60. An assumption is made that video data and audio data multiplexed and recorded on the storage medium 1 have been coded by the MPEG method or AC-3.

A digital-signal reproducing apparatus shown in FIG. 7 performs reproduction in such a manner that a portion of one continuous coded data item is skipped (skip-reproduced) on a random access storage medium 1 on which coded digital signals (coded and multiplexed video and audio data) have been recorded. To perform the reproduction, the digital-signal reproducing apparatus has a first decoding system 50 for reproducing first coded data positioned more forward than an omitting point (in front of a skip start point) to the skip start point and a second decoding system 60 for previously decoding data following an omission end point (a skip end point), that is, data from the leading end of a coded unit of second coded data to a connection point. Then, the second decoding system 60 is brought to a standby mode. Immediately after reproduction has been performed by the first decoding system 50 at the connection point for the skip reproduction, the second decoding system 60 in the standby mode starts reproducing coded data. To prevent the two decoded signals from becoming discontinuous in terms of time, output signals from the decoding systems 50 and 60 are switched by a switch 70 at a predetermined timing when the reproduction is performed.

Referring to FIG. 7, a unit 20 for reading coded data, similar to that shown in FIG. 6, reads coded and time-division-multiplexed video and audio data and stores data in a track buffer 30. The reading unit 20 is able to make a random access to the storage medium 1. When the skip reproduction is performed, the reading unit 20 is able to sequentially read coded data positioned more forward than the skip start point and that following the skip end point to store coded data in the track buffer 30 similarly to the above-mentioned structure. Moreover, the reading unit 20 furthermore reads all of coded data items required to decode coded data following the skip end point to store data in the track buffer 30. Specifically, the reading unit 20 includes a spindle motor 24 for rotating the storage medium 1, such as an optical disc, an optical head 20 for optically reading a signal from the rotating storage medium 1 and a signal processing and servo circuit 23 for performing various signal processes in accordance with the signal reproduced from the storage medium 1 by the optical head 20. The signal processing and servo circuit 23 as well as performs servo control operation. The signal processing and servo circuit 23 extracts a focus error signal and a tracking error signal from the signal reproduced from the storage medium 1 by the optical head 20. In accordance with the error signals, the signal processing and servo circuit 23 performs focusing and servo control of the optical head 20. In accordance with the signal reproduced from the storage medium 1 by the optical head 20, the signal processing and servo circuit 23 extracts information about the reproducing position (address information) on the storage medium 1 and information about the reproducing speed. In accordance with extracted information, the signal processing and servo circuit 23 performs rotation servo of the spindle motor 24 in such a manner that the linear speed is made to be constant. Moreover, the signal processing and servo circuit 23 samples a binary digital signal from the signal reproduced from the storage medium 1 by the optical head 20 to decode the digital signal and correct an error of the same. The decoded and corrected digital signal is output from the reading unit 20 as coded data.

Coded data read from the track buffer 30 is supplied to the first and second decoding systems 50 and 51.

Each of the first and second decoding systems 50 and 60 has a structure for separating data supplied from the track buffer 30 because data above is in the form obtained by time-division-multiplexing video and audio data items.

That is, the first decoding system 50 has a separator 51 for separating coded data of a time-division-multiplexed image and voice into coded data of an image and voice, decoding buffers 52V and 52A for temporarily storing coded data of an image and voice separated by the separator 51 and an image decoder 53V and a voice decoder 53A for decoding coded data stored in the decoding buffers 52V and 52A and read from the same at a predetermined timing. Also the second decoding system 60 has a separator 61 for separating coded data of a time-division-multiplexed image and voice into coded data of an image and voice, decoding buffers 62V and 62A for temporarily storing coded data of an image and voice separated by the separator 61 and an image decoder 63V and a voice decoder 63A for decoding coded data stored in the decoding buffers 62V and 62A and read from the same at a predetermined timing. The decoding buffers and the decoders of the decoding systems 50 and 60 are arranged to basically perform the same operations as those of the decoding buffer and the decoder of the decoding systems 11 and 12 shown in FIG. 6. The difference lies in that the video data signal and audio data signal are treated by corresponding units. Although the first decoding system 50 and the second decoding system 60 are independently operated, the decoding buffers 52V and 52A and the decoders 53V and 53A in the first decoding system 50 are simultaneously operated. The decoding buffers 62V and 62A and the decoders 63V and 63A in the second decoding system 60 are simultaneously operated.

Coded data of an image output from the first decoding system 50 is supplied to a switch terminal $S_{V1}$ of a switch 71 of a switch unit 70, while coded data of voice is supplied to switch terminal $S_{A1}$ of a switch 72 of the switch unit 70. Coded data of an image output from the second decoding system 60 is supplied to a switch terminal $S_{V2}$ of the switch 71 of the switch unit 70, while coded data of voice is supplied to switch terminal $S_{A2}$ of the switch 72 of the switch unit 70.

The switch unit 70 selectively switches coded data of an image and voice supplied from the first decoding system 50 and the second decoding system 60 at a predetermined timing similar to that set for the switch 9 shown in FIG. 6 when the skip reproduction is performed so as to output the selected coded data to an image display unit 80 and voice generating unit 90. That is, when the skip reproduction is performed, the operations of the switch terminal $S_{V1}$ of the switch 71 and the switch terminal $S_{A1}$ of the switch 72 of the switch unit 70 correspond to the switch terminal S1 of the switch 9 shown in FIG. 6. The operations of the switch terminal $S_{V2}$ of the switch 71 and the switch terminal $S_{A2}$ of the switch 72 of the switch unit 70 correspond to the switch terminal S2 of the switch 9 shown in FIG. 6.

As a result, also the structure shown in FIG. 7 is able to prevent discontinuity of decoded signals more forward than the skip start point and following the skip end point when the skip reproduction is performed.

Since the decoding period of video data and that of audio data do not necessarily coincide with each other as described above, the arrangement, in which continuous reproduction of video data is given priority when the skip reproduction is performed, encounters generation of a region (an audio gap), in which audio data is not generated as described in the prior art.

Accordingly, the digital-signal reproducing apparatus according to the present invention and shown in FIG. 7 has the following contrivance to prevent generation of the audio gap. In the following description, only one system of the two decoding systems 50 and 60 will be described for simplification.

FIGS. 8B and 8C show coded units (pictures and audio frames) of an image and voice more forward than the skip start point and following the skip end point when skip reproduction has been performed at a timing shown in FIG. 8A. Picture $V_A$ shown in FIG. 8B is a picture at the skip start point, while picture $V_B$ is a picture at the skip end point. Audio frame $A_C$ shown in FIG. 8C is an audio frame at the skip start point, while audio frame $A_D$ is an audio frame at the skip end point. Coded data more forward than the skip start point is decoded by the first decoding system 50, while coded data following the skip end point is decoded by the second decoding system 60. FIG. 8D shows a state in which pictures discontinuous in the skipped portion as shown in FIG. 8A are connected to be continuous in terms of time as has been performed in the foregoing embodiment.

In a case where the connection is established to maintain the continuity of pictures (maintain the continuity of images) when the skip reproduction is performed, the digital-signal reproducing apparatus according to this embodiment is, as shown in FIGS. 8E and 8H, arranged to overlap the regions across the skipped portion (audio frames $A_C$ and $A_D$) by causing the reading unit 20 to read coded data in the form in which audio data is multiplexed from the storage medium 1 so as to store coded data in the track buffer 30. That is, when coded data formed by multiplexing video data read from the storage medium 1 is connected to be continued in terms of time at the connection point of video data items indicated with a dashed line $C_V$ (pictures $V_A$ and $V_B$ are connected to each other), audio data which is multiplexed with video data above so as to be read from the storage medium 1 together with video data encounters generation of an overlapped time region (overlap $O_A$) as shown in FIGS. 8E and 8H. The first decoding system 50 decodes the audio frame $A_C$ more forward than the skip start point and including the portion in which audio data overlaps, while the second decoding system 60 decodes the audio frame $A_D$ following the skip end point.

Since the compression method, such as the MPEG and AC-3, has a structure in which the audio frame is coded by using a multiplicity of sampled points (hundreds to thousands points) as units, audio samples which are results of decoding form a data string having very short time intervals as compared with displaying intervals (pictures) of video signals, as shown in FIGS. 8F and 8G.

As shown in FIG. 9 which is an enlarged view of a state of the overlapped portion $O_A$ of audio data shown in FIG. 8, the digital-signal reproducing apparatus according to this embodiment is arranged to switch audio data at a sampling point (a point indicated with $C_A$ shown in FIG. 9) nearest the connection point $C_V$ of video data. That is, since the sampling period (intervals among sampling points) of audio data is considerably shorter than the displaying intervals (breakpoint of pictures) of video data, establishment of the connection in such a manner that audio data of the overlapped portion $O_A$ is switched at the sampling point $C_A$ nearest the switch point ($C_V$) of video data enables change of audio data at the connection point to be recognized to be continuous.

The digital-signal reproducing apparatus according to this embodiment is arranged in such a manner that the switch unit 70 performs the above-mentioned switching operation. When the skip reproduction operation is performed, the switch terminals $S_{V1}$ and $S_{V2}$ of the switch 71 for video data are operated similarly to the switch 9 shown in FIG. 6. The switch terminal $S_{A1}$ and $S_{A2}$ of the switch 72 for audio data perform switching operations in such a manner that switching is performed at the sampling point $C_A$ nearest the switch point $C_V$ of video data as described above with reference to FIGS. 8 and 9.

Although the above-mentioned embodiment has the structure that the switching point ($C_A$) of audio data is set to be substantially the same as the time of the switching point $C_V$, switching may be performed at any sampling point within the overlapped portion $O_A$.

The digital-signal reproducing apparatus according to this embodiment has a structure that a system controller 40 controls the operation of the reading unit 20 to read coded data from the storage medium 1, the operations for storing read coded data into the track buffer 30 and reading coded data from the same, the separating operation of the separator for the decoding systems 50 and 60, the operations for storing data into the decoding buffer and reading data from the same and the switching operation of the switch unit 70.

Video data output from the switch unit 70 as described above is supplied to an image display unit 80 having, for example, a CRT or a liquid crystal display device, while audio data is supplied to a voice generating unit 90 including, for example, a loud speaker unit. As a result, an image free from interruption even after the skip reproduction has been performed is displayed on the image display unit 80. On the other hand, voice free from interruption even after the skip reproduction has been performed is produced by the voice generating unit 90.

The structure in which one continuous (one stream) coded data recorded on the storage medium 1 is skip-reproduced has been described in the above-mentioned embodiment. However, the structure according to this embodiment enables continuous reproduction to be performed in also a case where two streams of coded data items ST1 and ST2 independently coded and recorded in the storage medium 1 are, as shown in FIGS. 10A and 10B, reproduced from the storage medium 1 in such a manner that, for example, a forward portion ($ST1_A$) of coded data ST1 and, for example, a rear portion ($ST2_B$) of coded data ST2 are connected to each other at arbitrary point J.

The structure of the digital-signal reproducing apparatus in the foregoing case will now be described with reference to FIG. 7. The reading unit 20 reads independently coded data from the storage medium 1 to store coded data in the track buffer 30. Then, the reading unit 20 supplies coded data stored in the track buffer 30 to the first decoding system 50 and the second decoding system 60. At this time, the first decoding system 50, similarly to coded data more forward than the skip start point, treats either of the independently coded data items. The second decoding system 60 treats the other coded data similarly to coded data following the skip end point. That is, to connect two coded data items to each other at an arbitrary point to reproduce the coded data items, the first decoding system 50 reproduces either of the coded data items to the connection point, while the second decoding system 60 previously decodes the other coded data to the connection point and then starts standby mode. After the reproducing operation of the first decoding system 50 has been completed at the connection point, the second decoding system 60 in the standby mode starts the reproducing operation. The switch unit 70 prevents discontinuity of coded data items decoded by the corresponding decoding systems 50 and 60 in terms of time by switching coded data output from the decoding systems 50 and 60 at a predetermined timing, and then supplies coded data to the following structure.

Although the foregoing embodiment has been described about the structure in which a video signal has been coded by the MPEG method which uses the P picture and the B picture, a similar effect can be obtained also in cases where only the I picture has been coded by the MPEG method and where the video signal has been coded by another predictive coding method.

According to the present invention, in which two or more decoding processes are independently operated to previously decode data across the skipped portion in the random access so as to switch decoded data at a predetermined timing, an image and voice can satisfactorily be reproduced before and after the skip reproduction.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A method of decoding a digital signal in such a manner that a coded data string read from a random access storage medium on which at least one coded data string in which predetermined coded units are continued is recorded is decoded, said method of decoding a digital signal comprising the steps of:

a first decoding step for, in the coded units, decoding a first coded data string more forward than a skip start point in a random access;

a second decoding step for decoding, in the coded units, a second coded data string including all of coded units required to perform decoding at a skip end point in the random access; and a switching step for switching a first decoded data string obtained by a decoding operation performed in said first decoding step to a second decoded data string obtained by a decoding operation performed in said second decoding step to correspond to skipping in the random access, wherein said second decoding step is arranged in such a manner that decoding of all of coded units required to perform decoding at the skip end point is completed prior to completion of decoding of the coded units to the skip start point in said first decoding step, and decoding of the coded units following the skip end point is commenced when decoding of the coded units to the skip start point in said first decoding step has been completed, and said switching step is arranged in such a manner that the first decoded data string is switched to the second decoded data string following the skip end point when decoding of the coded units to the skip start point in said first decoding step has been completed.

2. A method of decoding a digital signal according to claim 1, wherein said second decoding step is arranged in such a manner that decoding of the coded units including the skip end point is performed during decoding of the coded units including the skip start point which is performed in said first decoding step, and said switching step is arranged in such a manner that switching from the first decoded data string to the second decoded data string is performed at an arbitrary timing in a period in which decoded units obtained by decoding the coded units including the skip start point and decoded units obtained by decoding coded units including the skip end point are divided into pieces.

3. A method of decoding a digital signal according to claim 1, further comprising:

a separation step for separating a first data string and a second data string from the coded data string formed by multiplexing the first data string in which coded units each having a first length are disposed continuously and the second data string in which coded units each having a second length are disposed continuously, wherein the separated first data string and the second data string are supplied, to said first and second decoding steps as the coded data strings, said second decoding step is arranged in such a manner that decoding of all of coded units each having the first length and required to perform decoding at the skip end point is completed prior to completion of decoding of the coded units each having the first length to the skip start point in said first decoding step, and decoding of the coded units each having the second length and including the skip end point is performed during decoding of the coded units each having the second length and including the skip start point in said first decoding step, and said switching step is arranged in such a manner that the first decoded data string obtained by decoding the first data string is switched to the second decoded data string when decoding of the coded units each having the first length and in a region to the skip start point has been completed in said first decoding step, and switching from the first decoded data string obtained by decoding the second data string to the second decoded data string is performed at an arbitrary timing in a period in which decoded units obtained by decoding the coded units each having the second length and including the skip start point and decoded units obtained by decoding coded units each having the second length and including the skip end point are divided into pieces.

4. A method of decoding a digital signal according to claim 1, wherein the first coded data string is a coded data string which has been recorded on said storage medium in a region more forward than the skip start point when a portion of one continuous coded data string is skipped because of the random access, and the second coded data string is a coded data string which has been recorded on said storage medium in a region following the skip end point when a portion of the continuous coded data string is skipped because of the random access.

5. A method of decoding a digital signal according to claim 1, wherein the first coded data string and the second coded data string are coded data strings which have independently been coded.

6. An apparatus for decoding a digital signal to read a coded data string from a random access storage medium on which at least one coded data string in which predetermined coded units are continued is recorded to decode the coded data string, said apparatus for decoding a digital signal comprising:

first decoding means for, in the coded units, decoding a first coded data string more forward than a skip start point in a random access;

second decoding means for decoding, in the coded units, a second coded data string including all of coded units required to perform decoding at a skip end point in the random access; and switching means for switching a first decoded data string obtained by a decoding operation performed by said first decoding means to a second decoded data string obtained by a decoding operation performed by said second decoding means to correspond to skipping in the random access, wherein said second decoding means completes decoding of all of coded units required to perform decoding at the skip end point prior to completion of decoding of the coded units to the skip start point by said first decoding means, and commences decoding of the coded units following the skip end point when decoding of the coded units to the skip start point has been completed by said first decoding means, and said switching means switches the first decoded data string to the second decoded data string following the skip end point when said first decoding means has decoded the coded units to the skip start point.

7. An apparatus for decoding a digital signal according to claim 6, wherein said second decoding means decodes the coded units including the skip end point during decoding of the coded units including the skip start point which is performed by said first decoding means, and said switching means switches the first decoded data string to the second decoded data string at an arbitrary timing in a period in which decoded units obtained by decoding the coded units including the skip start point and decoded units obtained by decoding coded units including the skip end point are divided into pieces.

8. An apparatus for decoding a digital signal according to claim 6, further comprising separation means for separating a first data string and a second data string from the coded data string formed by multiplexing the first data string in which coded units each having a first length are disposed continuously and the second data string in which coded units each having a second length are disposed continuously, wherein the separated first data string and the second data string are supplied to said first and second decoding means as the coded data strings, said second decoding means completes decoding of all of coded units each having the first length and required to perform decoding at the skip end point prior to completion of decoding of the coded units each having the first length to the skip start point by said first decoding means, and decodes the coded units each having the second length and including the skip end point during decoding of the coded units each having the second length and including the skip start point by said first decoding means, and said switching means switches the first decoded data string obtained by decoding the first data string to the second decoded data string when decoding of the coded units each having the first length and in a region to the skip start point has been completed by said first decoding means, and switches the first decoded data string obtained by decoding the second data string to the second decoded data string at an arbitrary timing in a period in which decoded units obtained by decoding the coded units each having the second length and including the skip start point and decoded units obtained by decoding coded units each having the second length and including the skip end point are divided into pieces.

9. An apparatus for decoding a digital signal according to claim 6, wherein the first coded data string is a coded data string which has been recorded on said storage medium in a region more forward than the skip start point when a portion of one continuous coded data string is skipped because of the random access, and the second coded data string is a coded data string which has been recorded on said storage medium in a region following the skip end point when a portion of the continuous coded data string is skipped because of the random access.

10. An apparatus for decoding a digital signal according to claim 6, wherein the first coded data string and the second coded data string are coded data strings which have independently been coded.

11. An apparatus for reproducing a digital signal to read a coded data string from a random access storage medium on which at least one coded data string in which predetermined coded units are continued is recorded to decode the coded data string, said apparatus for reproducing a digital signal comprising:

reading means for reading the coded data string from said storage medium;

storage means on which the coded data string read from said storage medium by said reading means is stored;

first and second decoding means for independently decoding the coded data string read from said storage means; and switch means for selectively outputting the first decoded data string obtained by a decoding operation performed by said first decoding means or the second decoded data string obtained by a decoding operation performed by said second decoding means, wherein when the coded data string is read from said storage medium by performing a random access, said reading means reads a first coded data string more forward than a skip start point in the random access and a second coded data string including all of coded units required to perform decoding at a skip end point in the random access, at least the first coded data string more forward than the skip start point and the second coded data string including all of the coded units required to perform decoding at the skip end point, each of which has been read from said storage medium by said reading means, are stored in said storage means, said first decoding means, in the coded units, decodes the first coded data string more forward than the skip start point which has been read from said storage medium, said second decoding means completes decoding of all of the coded units required to perform decoding at the skip end point and read from said storage medium prior to completion of decoding of the coded units more forward than the skip start point by said first decoding means, and commences decoding of the coded units following the skip end point when said first decoding means has decoded the coded units more forward than the skip start point, and said switching means switches the first decoded data string to the second decoded data string following the skip end point when said first decoding means has decoded the coded units more forward than the skip start point.

12. An apparatus for reproducing a digital signal according to claim 11, wherein said second decoding means decodes the coded units including the skip end point during decoding of the coded units including the skip start point which is performed by said first decoding means, and said switching means switches the first decoded data string to the second decoded data string at an arbitrary timing in a period in which decoded units obtained by decoding the coded units including the skip start point and decoded units obtained by decoding coded units including the skip end point are divided into pieces.

13. An apparatus for reproducing a digital signal according to claim 12, further comprising separation means for separating a first data string and a second data string from the coded data string formed by multiplexing the first data string in which coded units each having a first length are disposed continuously and the second data string in which coded units each having a second length are disposed continuously, wherein the separated first data string and the second data string are supplied to said first and second decoding means, as the coded data strings, said second decoding means completes decoding of all of coded units each having the first length and required to perform decoding at the skip end point prior to completion of decoding of the coded units each having the first length to the skip start point by said first decoding means, and decodes the coded units each having the second length and including the skip end point during decoding of the coded units each having the second length and including the skip start point by said first decoding means, and said switching means switches the first decoded data string obtained by decoding the first data string to the second decoded data string when decoding of the first coded units in a region to the skip start point has been completed by said first decoding means, and switches the first decoded data string obtained by decoding the second data string to the second decoded data string at an arbitrary timing in a period in which decoded units obtained by decoding the coded units each having the second length and including the skip start point and decoded units obtained by decoding coded units each having the second length and including the skip end point are divided into pieces.

14. An apparatus for reproducing a digital signal according to claim 12, wherein the first coded data string is a coded data string which has been recorded on said storage medium in a region more forward than the skip start point when a portion of one continuous coded data string is skipped because of the random access, and the second coded data string is a coded data string which has been recorded on said storage medium in a region following the skip end point when a portion of the continuous coded data string is skipped because of the random access.

15. An apparatus for reproducing a digital signal according to claim 12, wherein the first coded data string and the second coded data string are coded data strings which have independently been coded.

* * * * *